3,484,886
PIPELINE PIG
Harry J. Girard, 3202 Huntingdon Place,
Houston, Tex. 77019
Filed June 28, 1968, Ser. No. 741,182
Int. Cl. B08b 9/04
U.S. Cl. 15—104.06                              8 Claims

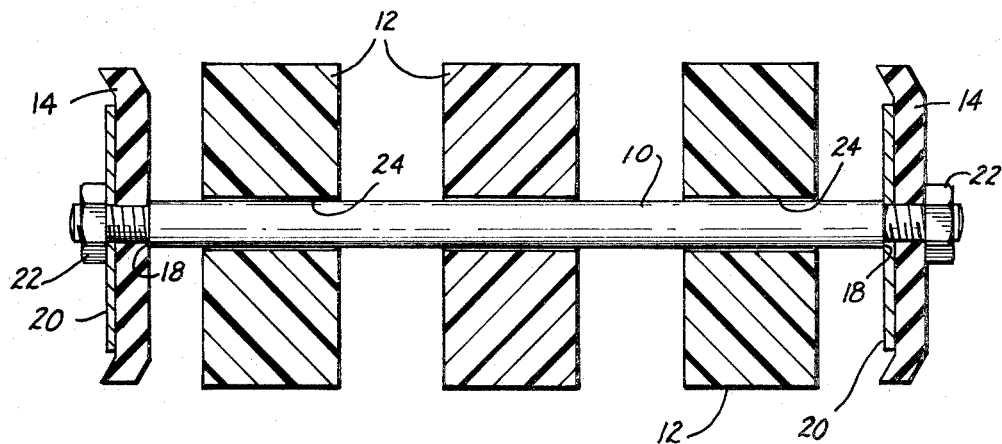
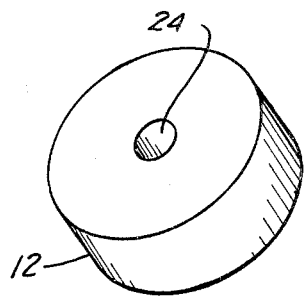
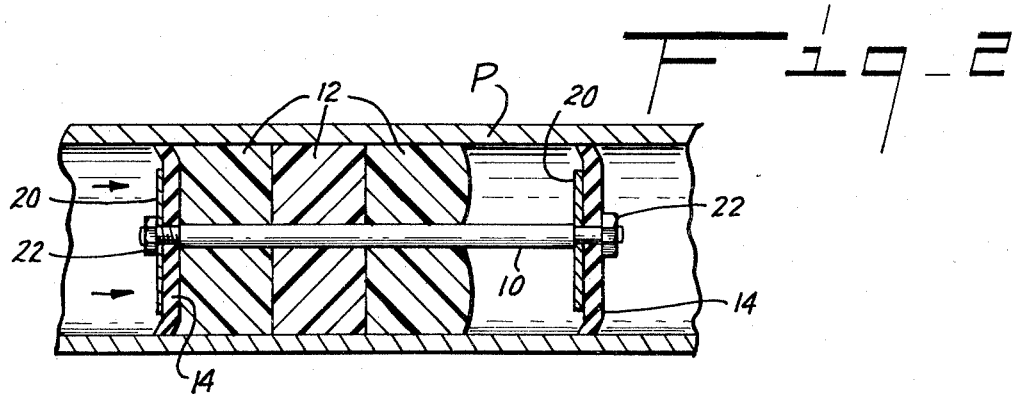
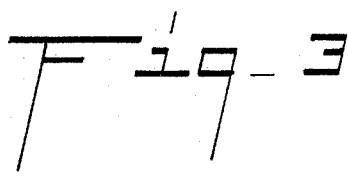

ABSTRACT OF THE DISCLOSURE

A pig for use in pipelines to be propelled therethrough by a pressure gradient in the line and including body elements of relatively soft resilient material and retainer members of harder resilient material mounted on a central shaft and shaped for sealing engagement with the internal surface of the pipe to close the pipe against leakage past the pig. The assemblage is constructed to be readily disassembled to allow replacement of the parts.

Background of the invention

In the cleaning of pipelines, and for the purpose of preventing intermixing of different fluids which it may be desired to transport through such lines, pipeline pigs are inserted in the lines between such fluids, to be propelled therethrough by the pressure gradient in the line. Heretofore, various designs of pigs have been used for this purpose, such as solid rubber balls and elongated cylindrically shaped bodies of resilient material such as rubber or foamed plastics.

The interior of pipelines is usually by no means entirely uniform and smooth, there being various irregularities, such as pits and rough surface areas due to corrosion, locations where the cross-sectional shape of the pipe is irregular, curves in the line, and cavities and edges at locations where couplings occur, so that pipeline pigs are often subject to extreme conditions of wear and tear when propelled through such lines.

In order to allow pipeline pigs to pass through bends of other irregularities in the line, such pigs are usually formed of resilient material, such as rubber or foamed plastics and due to the relative softness of the material the pigs are frequently deformed, rolled up or wrinkled by the pressure applied thereto, to an extent to permit leakage past the pigs, thus rendering the same useless.

The present invention has for an important object the provision of a pipeline pig which is designed to effectively resist the wear and tear of passage through a pipeline having irregularities of the kind referred to and wherein the parts may be readily replaced when worn.

Another object of the invention is to provide a pipeline pig having a main body portion made up of a relatively soft resilient material and portions formed of relatively hard, resistant, but resilient end or backing portions for retaining the main body portion in shape and reducing the distortion and wear resulting from the pressure applied to the pig.

Another object of the invention is the provision of a pipeline pig whose length may be readily varied to provide greater or less sealing area of the pig in engagement with the pipe.

Summary of the invention

Briefly described, the pig of the invention comprises a central shaft or core of rigid material, upon which one or more relatively soft, resilient, annular body elements is mounted mediate the ends of the shaft to form a main body portion, and annular, resilient retainer or back-up members formed of a harder material than the main body portion positioned on the shaft at each end thereof. The elements and members are of somewhat larger outer diameter than the internal diameter of the pipe in which the pig is to be used and the parts are releasably mounted on the shaft to permit the length of the main body portion to be increased or decreased as desired and to permit replacement of the parts when worn.

The objects and advantages of the invention will be apparent from the following description of a particular embodiment of the same when considered with the annexed drawings.

Brief description of the figures of the drawings

FIGURE 1 is a side elevational view, partly in cross-section of a preferred embodiment of the invention showing the structure of the various parts and the manner in which the same are assembled;

FIGURE 2 is a perspective view of one of the annular body elements of the invention; and FIGURE 3 is a longitudinal, central, cross-sectional view, on a somewhat reduced scale, of a portion of a pipeline, showing the pig of the invention in its operating position therein.

Description of a specific embodiment of the invention

Referring now to the drawings in greater detail the pig of the invention comprises an elongated, generally cylindrically shaped body made up of a central rigid rod or shaft 10, threaded at its opposite ends and upon which a number of resilient body elements 12, of annular or doughnut shape are slidably disposed to form a relatively soft body capable of conforming to the internal shape of the pipe into which the pig is to be inserted. Seal forming back-up or retainer members or cups 14 are removably mounted on each end of the central shaft to form a unitary assembly. Each of the retainer members 14 has a central opening to fit the shaft 10 and outer diameter of the members is at least equal to and preferably somewhat larger than the internal diameter of the pipe in which the pig will be used.

The shaft 10 may be formed at its ends with reduced portions 16 to provide annular shoulders 18 against one of which one of the retainer members 14 is seated at one end of the shaft, as seen at the left end of FIGURE 1, the member being securely held in place by a washer 20, formed of rigid material, such as steel. At the other end of the shaft another of the washers 20 is seated against the shoulder 18, and the other of the members 14 is seated against the washer. The washers and members are held in assembled condition on the ends of the shaft by suitable means, such as the nuts 22, threaded thereon.

The retainer members 14 may be somewhat cup shaped and formed of a resilient material which is of greater hardness or firmness than that of the body elements 12, such as molded rubber or plastic, and of suitable thickness to serve as backing members for the body elements.

The retainer members are disposed on the shaft with the cups opening in the same direction away from the direction of movement of the pig in the pipe, which is toward the right as shown in FIGURES 1 and 3.

The body elements 12 are preferably of identical construction, formed of a softer and more resilient material than the member 14, such as sponge rubber, foamed plastic, or the like, and are formed with a central opening 24 preferably somewhat larger in diameter than the shaft 10. The outer diameter of the elements 12 is preferably somewhat larger than the internal diameter of the pipe in which the pig is to be used, so that the elements will be compressed into sealing engagement with the pipe when the pig is inserted. The body elements 12 may be of any desired axial length, preferably such that a number of the elements may be placed on the shaft between the end members 14.

In making use of the pig of the invention, the parts are assembled as shown in FIGURE 1 and the device is inserted into a pipeline, such as that indicated at P in FIGURE 3. When the pig is inserted into the line the body members 12 will be compressed into sealing engagement with the internal surface of the pipe and with the shaft 10, while the retainer members 14 will be held in sealing engagement with the pipe about their peripheries.

When thus inserted, the pig may be propelled along the pipe by the pressure of fluid flowing through the pipe.

It is to be noted that the shaft 10 may slide longitudinally through the elements 12, so that the member 14, at the trailing end of the pig, will be in engagement with one of the elements and the elements will be moved together, as seen in FIGURE 3 in engagement with the pipe to wipe the internal surface of the pipe and to prevent any leakage of fluid past the pig.

It will be apparent that the device may be readily disassembled for the purpose of replacing the body elements or retainer members when desired.

Due to the resilient character of the body elements and retainer members the pig may readily conform to irregularities in the cross-sectional shape of the pipe or pass through bends therein.

It will thus be seen that the invention provides a pipeline pig which is of simple design and in which the parts are easily replaceable for purposes of maintenance and repair.

Having thus clearly shown and described the invention, what is claimed as new and desired to secure by Letters Patent is:

1. A pig for insertion in a pipeline to be propelled through the pipe by a pressure gradient comprising:
  (a) a main body of annular shape formed of resilient material and whose diameter is greater than the internal diameter of the pipe,
  (b) an annular, resilient, back-up member for each end of the pig, formed of a material of less resilience than said main body and whose outer diameter is greater than the internal diameter of the pipe, and
  (c) means for assembling said main body and said back-up members on a common axis.

2. The pig as defined in claim 1, wherein said means for assembling the main body and back-up members is a rigid shaft extending centrally through the main body and back-up members.

3. The pig as defined in claim 2, wherein said shaft is of greater length than the combined axial length of the main body and back-up members.

4. The pig as defined in claim 2, including additionally a rigid washer positioned coaxially against the trailing face of each of said back-up members and whose outer diameter is less than the internal diameter of the pipe.

5. The pig as defined in claim 4, wherein said shaft is formed adjacent each end with an annular shoulder against one of which the leading face of the trailing one of said back-up members is seated and against the other of which the trailing face of the leading one of said washers is seated.

6. The pig as defined in claim 1 wherein said back-up members are of cup shape.

7. The pig as defined in claim 1 wherein said main body comprises a plurality of annular elements.

8. The pig as defined in claim 7, wherein said elements are of the same axial length and said members are of less axial length than said elements.

References Cited

UNITED STATES PATENTS 2,188,959   2/1940   Schaer.

EDWARD L. ROBERTS, Primary Examiner